US008292457B2

(12) United States Patent
Schenk et al.

(10) Patent No.: US 8,292,457 B2

(45) Date of Patent: Oct. 23, 2012

(54) LAMP

(75) Inventors: Stephen Schenk, Donaueschingen (DE); Reinhard Binder, Donaueschingen (DE); Volker Weinmann, Trossingen (DE)

(73) Assignee: Herbert Waldmann GmbH & Co. KG, Villingen-Schwenningen (DE)

( * ) Notice: Subject to any disclaimer, the term of this patent is extended or adjusted under 35 U.S.C. 154(b) by 124 days.

(21) Appl. No.: 12/741,169

(22) PCT Filed: Oct. 30, 2008

(86) PCT No.: PCT/EP2008/009148

§ 371 (c)(1),
(2), (4) Date: Jun. 14, 2010

(87) PCT Pub. No.: WO2009/083057

PCT Pub. Date: Jul. 9, 2009

(65) Prior Publication Data

US 2010/0259938 A1 Oct. 14, 2010

(30) Foreign Application Priority Data

Dec. 27, 2007 (DE) ........................ 10 2007 063 335

(51) Int. Cl.
*F21V 21/00* (2006.01)
*F21V 15/00* (2006.01)
*B60Q 3/04* (2006.01)

(52) U.S. Cl. ............... 362/217.11; 362/217.13; 362/362

(58) Field of Classification Search .......... 362/147–150, 362/217.01, 223, 224, 217.1, 217.11, 217.12, 362/217.13, 362, 364–368, 97.1, 97.4; 40/367, 40/452, 541, 545, 549, 564

See application file for complete search history.

(56) References Cited

U.S. PATENT DOCUMENTS 4,205,471 A * 6/1980 Coleman ........................ 40/572
4,488,368 A * 12/1984 Coleman ........................ 40/564
4,691,267 A * 9/1987 Giesberg ...................... 362/218
4,766,685 A * 8/1988 Kramer .......................... 40/574

(Continued)

FOREIGN PATENT DOCUMENTS

DE 1623351 4/1951

(Continued)

OTHER PUBLICATIONS

German Office Action, German Appln. No. 10 2007 063 335.3 filed Dec. 27, 2007, 6 pages (with English translation).

(Continued)

*Primary Examiner* — David Crowe

(74) *Attorney, Agent, or Firm* — Andrew F. Young, Esq.; Lackenbach Siegel, LLP

(57) ABSTRACT

The invention is a lamp consisting of a housing frame formed of four interconnected profile strips; a translucent pane made of glass or synthetic set into one housing side; a bottom plate set into the opposite side; as well as an illuminant, arranged in the housing, with the profile strips having on the exterior side of the housing border strips for attachment purposes and, on the interior side, backing strips to support and attach the pane or, respectively, the bottom plate, that are designed identically and arranged in mirror-symmetric fashion; with, moreover, the pane being connected to the profile strips of the housing frame by means of contact-pressure strips screwed together with the backing strips, and the attachment screws for the contact-pressure strips being screwed into threaded bore holes running vertically to the strip surface.

18 Claims, 5 Drawing Sheets

U.S. PATENT DOCUMENTS

| | | | | |
|---|---|---|---|---|
| 4,851,971 | A * | 7/1989 | MacLagan | 362/97.4 |
| 4,969,075 | A * | 11/1990 | Helm et al. | 362/330 |
| 5,154,507 | A * | 10/1992 | Collins | 362/218 |
| 2004/0008512 | A1 | 1/2004 | Kim | |
| 2005/0088845 | A1 * | 4/2005 | Incikaya | 362/217 |
| 2008/0143918 | A1 * | 6/2008 | Kim | 349/58 |

FOREIGN PATENT DOCUMENTS

| | | | |
|---|---|---|---|
| DE | 1048543 | | 1/1959 |
| DE | 364 30 75 | A1 | 12/1986 |
| DE | 196 15 276 | A1 | 4/1996 |
| DE | 197 19 184 | C1 | 5/1997 |
| DE | 19615276 | | 10/1997 |
| DE | 202 12 411 | A1 | 8/2002 |
| EP | 0616168 | | 9/1994 |
| JP | 2000-231353 | | 8/2000 |
| JP | 2007-114500 | | 5/2007 |
| KR | 2998-033116 | | 10/1997 |

OTHER PUBLICATIONS

PCT/EP2008/009148 International Search Report, 4 pages, Feb. 4, 2009.

Korean Pat. Appln. No. 10-2010-70109015, Notice of Preliminary Rejections, 4 pages—English.

Japanese Pat. Appln. Serial No. 2010-540037 Office Action issued Aug. 7, 2012, 2 pages, Japanese, 2 pages, English.

* cited by examiner

LAMP

CROSS REFERENCE TO RELATED APPLICATIONS

This application claims priority from German Patent Application Serial No. 10 2007 063 335.3, filed Dec. 27, 2007, and later PCT/EP2008/009148, published as WO2009/083057 A1, filed 30 Oct. 2008, the entire contents of each of which are herein incorporated fully by reference.

FIGURE FOR PUBLICATION

FIG. 2

BACKGROUND OF THE INVENTION

1. Field of the Invention

The present invention relates to a lighting fixture of a kind typically utilized in office or workshop environments. More specifically, the present invention relates to a lighting fixture having: a housing frame formed of four interconnected profile strips; a translucent pane set into one side of the housing on the interior side of the frame; a bottom plate set into the side opposite of the translucent pane; and, an illuminant, in particular a fluorescent lamp or an LED arrangement, arranged in said housing frame.

2. Description of the Related Art

The related art involves lamps and/or lighting fixtures of a kind typically utilized in office or workshop environments Such a lamp has been known from DE AS 1 048 543 as well as from DE 202 411 U1.

In the case of the known lamp, the profile strips forming the housing frame, namely extruded profile rods, have border strips on the exterior side of the housing with which the housing can be attached to a wall or a similar background.

On the interior side of the housing, the profile strips have backing strips that serve as support and attachment of the pane or, respectively, of the bottom plate.

Lamps of this type but without border strips serving as an attachment in which the backing strips provided on the profile strips are designed identically and arranged in mirror-symmetric fashion to each other have been known from EP 0 616 168 A1.

In the case of use of the lamp as a surface mounting lamp, i.e. where the border strips are to be attached to an underground, the bottom plate is located in proximity to the border strips while the translucent pane is provided on the opposite side of the housing.

What is not appreciated by the prior art is that in the case of use of the lamp as a surface mounting lamp, i.e. where the border strips are to be attached to an underground, the bottom plate is located in proximity to the border strips while the translucent pane is provided on the opposite side of the housing. If, on the other hand, the lamp is to be set into a recess provided in a wall, i.e. if it is to be used as built-in lamp, the pane is to be provided on the plane of the border strips while the bottom plate is located on the opposite side of the housing.

These two types of utilization require differently designed profile strips due to the different attachment of the pane and of the bottom plate.

Accordingly, there is a need for an improved lamp having profile strips suitable for the manufacture of a frame for surface mounting lamps as well as for built-in lamps in order to make the manufacture of the lamps even more economical.

ASPECTS AND SUMMARY OF THE INVENTION

An aspect of the present invention is to provide an improved lamp having profile strips suitable for the manufacture of a frame for surface mounting lamps as well as for built-in lamps in order to make the manufacture of the lamps even more economical.

This objective is met in accordance with the invention with profile strips as characterized in conjunction with a lamp as described herein.

Essentially, this lamp consists of a housing frame formed of four interconnected profile strips; a translucent pane made of glass or synthetic set into one housing side; a bottom plate set into the opposite side; as well as an illuminant, in particular a fluorescent lamp or a LED arrangement, arranged in the housing.

The profile strips forming the housing frame, namely extruded profile rods, have border strips on the exterior side of the housing with which the housing can be attached to a wall or a similar background.

On the interior side of the housing, the profile strips have backing strips that serve as support and attachment of the pane or, respectively, of the bottom plate.

In an aspect of the present invention, in the case of the profile strips, the backing strips are designed identically and arranged in mirror-symmetrical fashion to the effect that the pane or, respectively, the bottom plate can be placed alternatively in either housing side. Contact pressure strips are provided for the attachment of the pane that can be screwed to the housing frame formed by the profile strips. The bottom plate, on the other hand, can be screwed directly to the backing strips.

To fix the contact pressure strips as well as the bottom plate in place, the latter are equipped with angular offsets located on the exterior borders in accordance with the proposal as per Claim 2 that engage with acceptance slits of the backing strips. These acceptance slits as well as the angular offsets of the contact pressure strips and of the bottom plate are also designed identically and arranged in mirror-symmetrical fashion. In an installed state, the angular offsets are directed against each other.

This design has the additional advantage that the lamp can be serviced from both sides since the border strips as well as the bottom plate can be unscrewed at any time, thereby allowing unhindered access to the interior of the lamp. Such a lamp constructed of prefabricated elements, in particular profile strips, can be manufactured advantageously in a simple and economical manner in various sizes.

According to another embodiment of the present invention, the backing strips have furrow-like grooves on their exterior sides into which sealants, preferably in accordance with Claim 4 in the form of two-component polyurethane foam material, can be filled. This makes it possible to easily manufacture a lamp that is dustproof and protected from splash water.

In a further embodiment of the present invention, a further simplification of the manufacture is proposed to provide the threads for the attachment screws in threaded strips that can be slid into grooves running parallel to the surface of the backing strips.

In an additional embodiment of the present invention, the profile strips are mitered at their seams. In this case, a corner connector is provided for a connection of the profile strips that can be inserted into the upwardly open grooves of the profile strips, for example into the grooves accommodating the thread strips. In order to achieve a tight finish in this area, it is advantageous if sealants are placed between the mitered seams of the profile strips.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
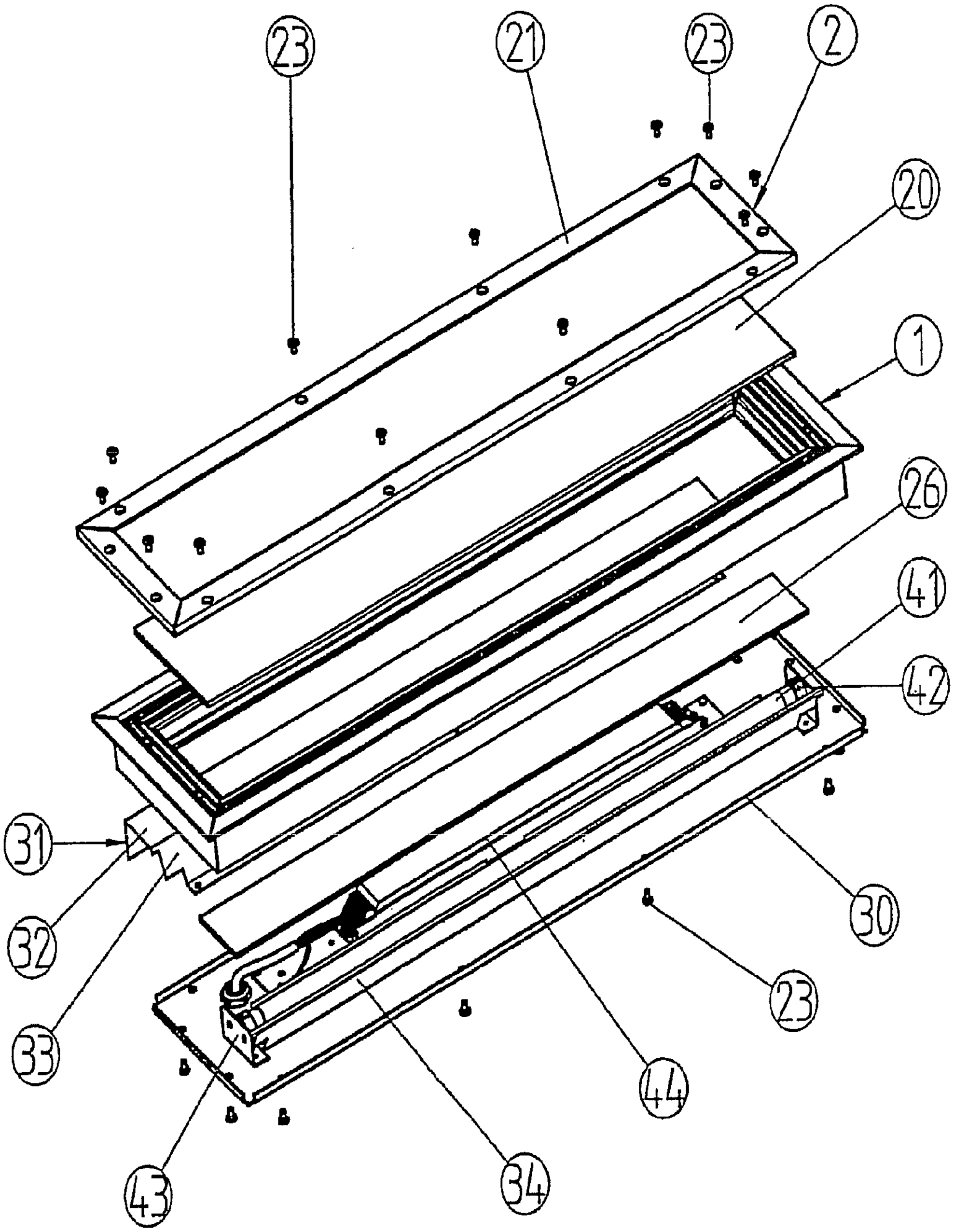
FIG. 1 is a perspective exploded view of an embodiment of the lamp in accordance with the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The exploded view in accordance with FIG. 1 shows the structural elements of the lamp in accordance with the invention in their spatial correlation.

The lamp has a central frame 1 into which a pane of a translucent material 20, e.g. a glass pane, is inserted from above and a bottom plate is 30 is screwed on from below with screws 23.

The pane 20 is attached to the frame 1 by means of the individual contact-pressure strips 21 that form a second frame 2 and that are connected to the frame 1 by means of screws 23.

The bottom plate 30 supports the fluorescent lamp 41 together with its lamp sockets 42 by means of angular sheets. The control gear 44 is arranged next to the fluorescent lamp 41 on the bottom plate 30. One sheet 31 serves to cover the control gear 44 with its angular offset 32 and, with its connected angular offset, as reflector 33 for the fluorescent lamp 41. This reflector 33 is supplemented by a second reflector sheet 34 arranged on the bottom plate 30.

A screen 26, e.g. a prism screen, is provided above the fluorescent lamp 41 but below the panes 20.

Figure 2:
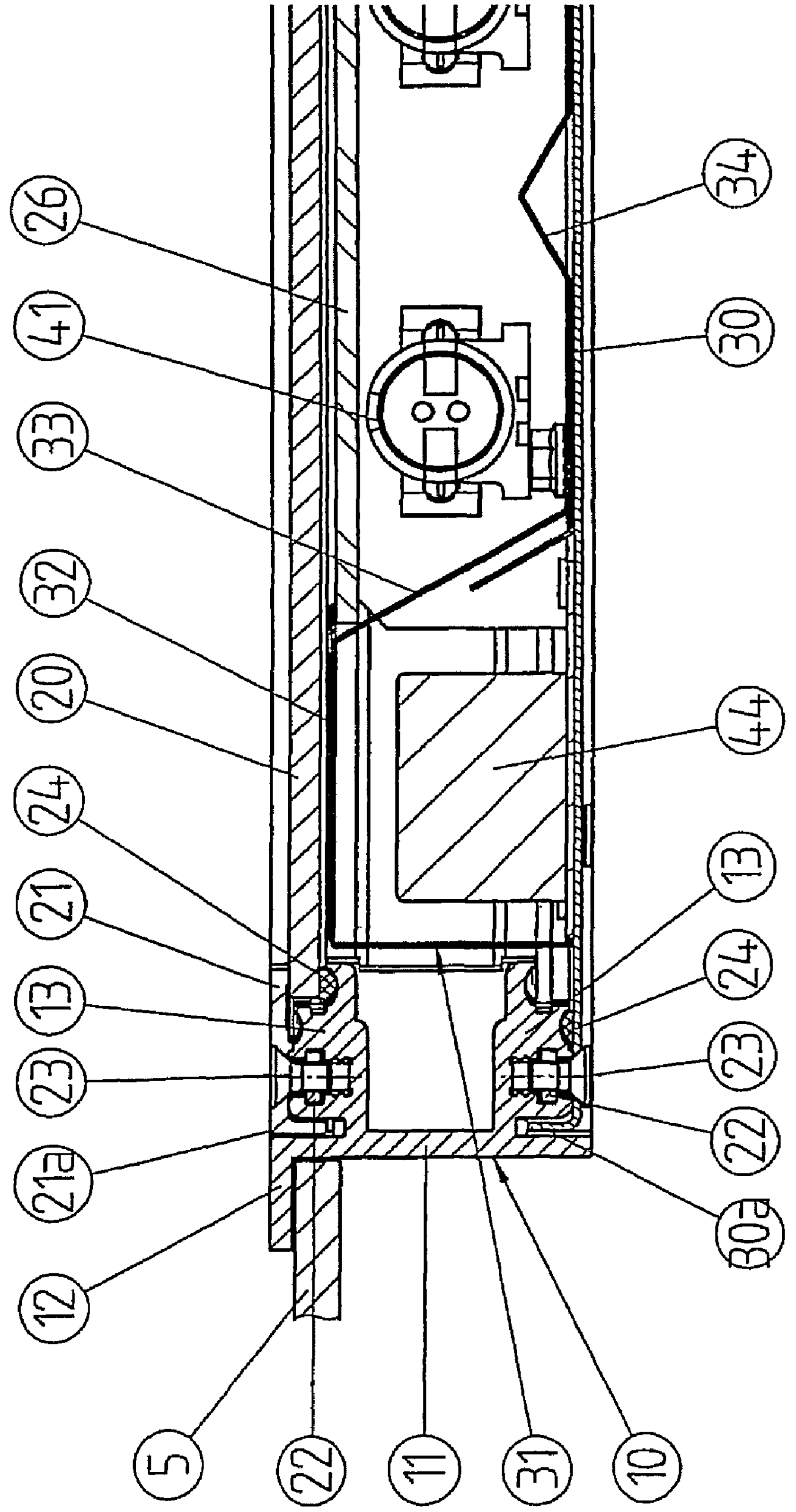
FIG. 2 is an axial partial section of the lamp, in accordance with FIG. 1, wherein said lamp is acting as a built-in illuminator.
Figure 3:
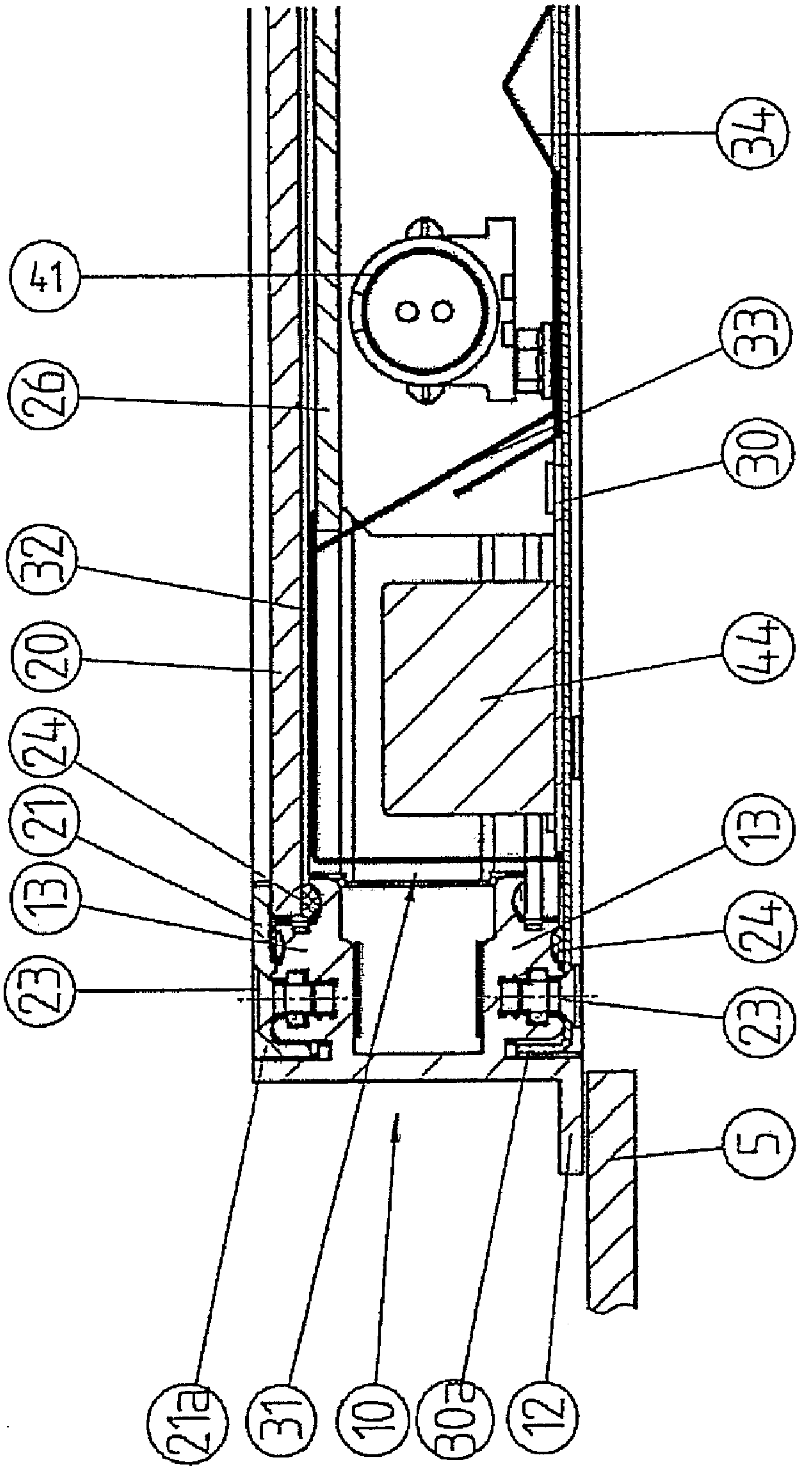
FIG. 3 is an axial partial section of the lamp, in accordance with FIG. 1, wherein said lamp is acting as a surface-mounting illuminator.

FIGS. 2 and 3 illustrate two different installation options.

The profile strips 10 forming the frame 1 are designed in such a way that the lamp, as shown in FIG. 2, can be inserted into a recess of a wall 5, the laterally protruding border strips 12 of the profile strips 10 being connectable to the wall near the recess, e.g. by means of screws.

The representation in accordance with FIG. 3 shows the modification of the lamp assembled as surface-mounting lamp and constructed with the same structural elements. In this case, the lamp frame formed with the profile strips 10 is attached to the wall 5 with its laterally protruding border strips 12, e.g. by means of screws.

Figure 4:
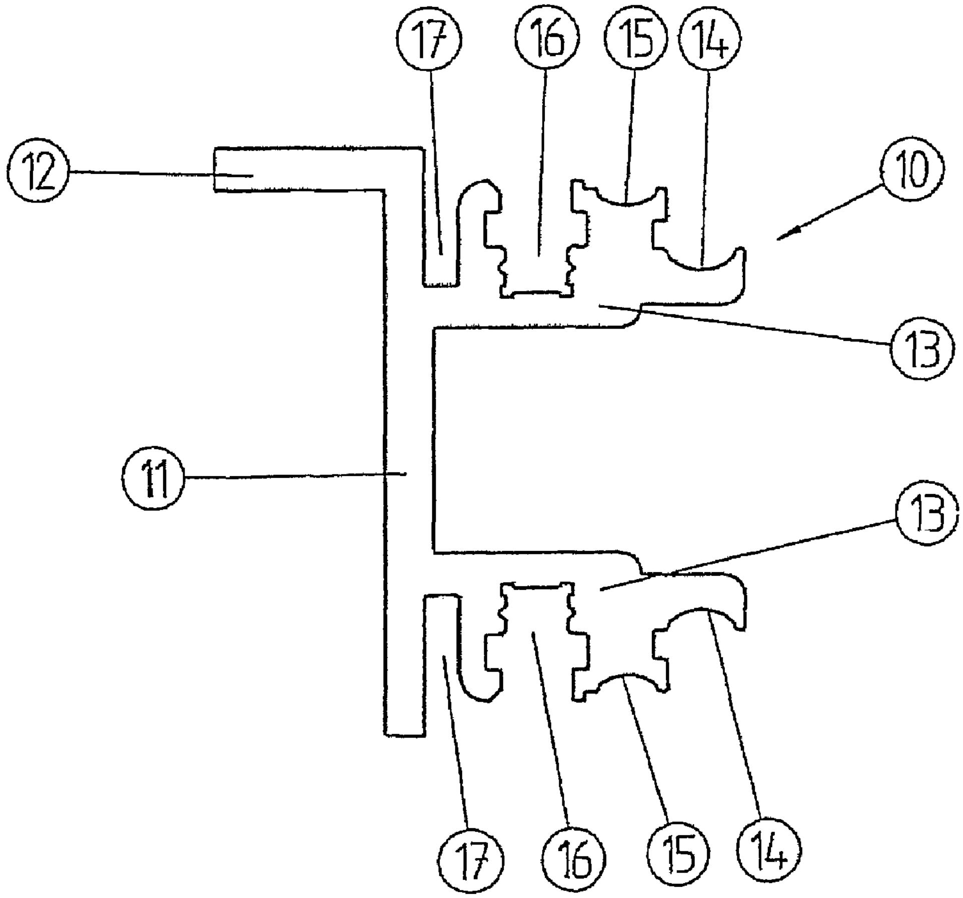
FIG. 4 is an enlarged section of the profile strip in accordance with the present invention.

These different usage categories are made possible by the design of the profile strips 10 in accordance with the invention whose enlarged cross section can be seen in FIG. 4.

As FIG. 4 shows, the profile strips 10 are constructed on their side facing the interior of the lamp in mirror-symmetrical fashion relative to the A-A axis of symmetry.

Horizontally directed backing strips 13, here shown vertically, are provided on both sides of this line on the wall part 11. At their exterior ends, the backing strips 13 have furrowed grooves 14 and 15 to accommodate sealants 24.

Moreover, one groove 16 each is provided to accommodate a threaded slide-in strip 22 as well as a receptacle slit 17 to accommodate the angular offsets 21*a* of the contact-pressure strips 21 or, respectively, of the angular offsets 30*a* of the bottom plate 30 as explained in detail below.

Only one border screen 12 is provided on the exterior side of the wall part 11 at one of its ends for which there is no symmetrical counterpart.

This design of the profile strips 10 makes the manufacture of a built-in lamp as well as of a surface-mounting lamp possible with the same structural elements, as shown in FIGS. 2 and 3.

In the case of the built-in lamp in accordance with FIG. 2, the translucent pane 20 is arranged in the vicinity of the circumferential border screen 12. Here, the pane 20 rests on the end of the backing strip 13 protruding towards the interior, with the sealant injected into the groove 14 and consisting of a 2-component polyurethane foam material providing a dust-tight and spray-water protected finish. The border strips 21 resting on the upper side of the pane 20 fix the pane 20 in place. They are connected to the backing strip 13 by means of screws, with the threaded slide-in strips 22 inserted into the groove 16 containing the threaded bore holes 22*a* for the screws 23 (cf. FIG. 5). The end of the contact-pressure strip 21 adjacent to the border screen 12 is designed in the form of an angular offset 21*a* that engages in the receptacle slits 17 of the profile strips 10.

The bottom plate 30 is similarly connected to the lower backing strip 13 designed in mirror-image fashion, namely by means of screws 23. These screws also engage in the threads of the threaded slide-in strip 22 inserted into the groove 16.

The end of the bottom plate 30 adjacent to the wall part 11 is designed similarly to the contact-pressure strips 21 as an angular offset 30*a* that engage in the slits 17 of the profile strip.

In order to obtain a dust-tight and spray-water protected finish, a sealant 24 consisting of a 2-component polyurethane material is injected into the groove 15 between the bottom plate 30 and the backing strip 13.

The mirror-symmetrical design of the profile strips 10 make the construction of a surface-mounting lamp possible with the same structural elements, as shown in FIG. 3. Compared with the structure in accordance with FIG. 2, the bottom plate 30 and the pane 20 and the appurtenant contact pressure strips 21 are transposed in this case.

The design of the structural elements as well as of the arrangement of the electrical components remains unchanged.

The fluorescent lamp 41 together with its reflectors 33 and 34 and the control gear 44 are arranged in the interior of the lamp. The control gear 44 is covered by an angular offset 32 of the metal sheet 31. A screen, e.g. a prism screen 26, is arranged above the fluorescent lamp 41.

Figure 5:
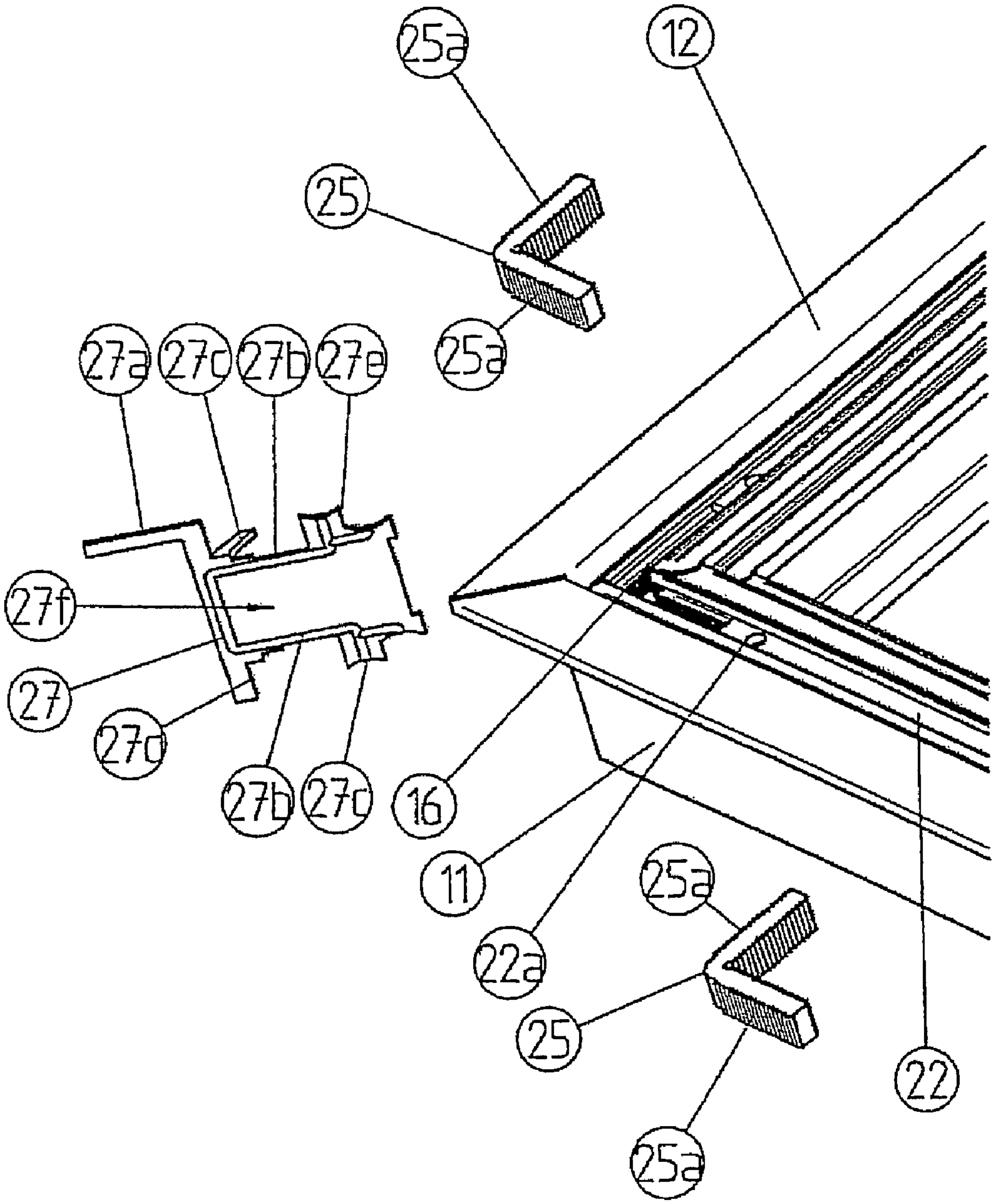
FIG. 5 is a perspective exploded view of the frame in the corner area of the lamp assembly.

Housing frames 1 of any desired dimensions can be manufactured using the profile strips 10 that are designed in accordance with the invention and that are advantageously made of extruded aluminum. The profile strips are advantageously mitered at their seams. For their connection in the corner area, as shown in FIG. 5, corner connectors 25 also made of aluminum are provided whose shanks 25*a* arranged at a right angle to each other are pressed from above into the grooves of the profile strips abutting each other. To improve the pressure fit, the shanks 25*a* are equipped with furrow-shaped grids on their surface.

As FIG. 5 further illustrates, the threaded slide-in strips do not reach all the way into the corner area, thus leaving space to accommodate the shanks 25*a* of the corner connectors 25.

A corner sealant 27 made of a synthetic material whose profile, with its projections and bridges 27 a through 27*d* in the cross section corresponds to the mitered surface, is placed between the mitered surfaces of the profile strips 10 abutting each other. The bridge 27*e* sticking out laterally protrudes into the frontal end of a threaded slide-in groove 16.

A flexible membrane 27*f* serving to stabilize the bridges and the sealant is formed between the bridges 27*d*. The corner sealant 27, like the sealants 24, is made of soft polyurethane.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A lamp, said lamp comprising:

(a) a housing frame formed of four interconnected profile strips, with said profile strips having on the exterior side of said housing frame a set of one or more border strips, said one or more border strips for attaching said housing frame to a surface;

(b) a translucent pane, set into one housing side, on the interior side of said housing frame;

(c) a bottom plate set into a second housing side opposite of said translucent pane;

(d) an illuminant, said illuminant arranged in said housing frame; and (e) a pair of backing strips extending from each of said profile strips provided to support and attach said translucent pane or, respectively, said bottom plate, and wherein each said pair of backing strips are designed identically and arranged in mirror-symmetric fashion about a parallel plane therebetween;

wherein said translucent pane is connected to a corresponding one of said profile strips of said housing frame by means of contact-pressure strips screwed together with a set of one or more attachment screws with said pair of backing strips, with each one of said attachment screws being screwed into a corresponding threaded bore hole in said backing strips running perpendicularly to the contact-pressure strip surface; and wherein each of said pair of backing strips has grooves running parallel to a surface of said profile strip into which a corresponding threaded slide-in strip has been inserted.

2. The lamp in accordance with claim 1, wherein said translucent pane is manufactured from the group comprising:

(a) glass; and (b) synthetic glass.

3. The lamp in accordance with claim 1, wherein said illuminant is selected from the group comprising:

(a) a fluorescent lamp; and (b) an LED arrangement.

4. The lamp in accordance with claim 1, wherein each said backing strip has a receptacle slit, and the bottom plate as well as said contact-pressure strips, have angular offsets engaging in a corresponding receptacle slit.

5. The lamp in accordance with claim 1, wherein each of said pair of backing strips has a set of furrowed grooves on their exterior sides to accommodate sealants.

6. The lamp in accordance with claim 5, wherein said sealants are inserted into said furrowed grooves, said sealants further comprising a 2-component polyurethane foam material.

7. The lamp in accordance with claim 1, wherein each of said profile strips are mitered at their seams to form upwardly open grooves and wherein connectors are inserted into the upwardly open grooves and are connected to corresponding threaded slide-in strips in a corner of said respective seam.

8. The lamp in accordance with claim 7, wherein sealants are inserted between the mitered surfaces of said profile strips, said profile strips abutting each other.

9. The lamp in accordance with one of claim 1, wherein each of said contact-pressure strips are mitered at their seams.

10. The lamp in accordance with claim 1, wherein:

(a) said profile strips are extruded profiles made of a light metal; and (b) said bottom plate is made of metal.

11. The lamp in accordance with one of claim 1, wherein a set of one or more reflector plates are arranged on said bottom plate proximate said illuminant.

12. A lamp, said lamp comprising:

(a) a housing frame formed of four interconnected profile strips, with said profile strips having on the exterior side of said housing frame a set of one or more border strips, said one or more border strips for attaching said housing frame to a surface;

(b) a translucent pane, set into one housing side, on the interior side of said housing frame;

(c) an illuminant, said illuminant arranged in said housing frame;

(d) a bottom plate set into a second housing side opposite of said translucent pane; wherein a set of one or more reflector plates are arranged on said bottom plate proximate said illuminant; and (e) a pair of backing strips extending from each of said profile strips provided to support and attach said translucent pane or, respectively, said bottom plate, and wherein each said one or more pair of backing strips are designed identically and arranged in mirror-symmetric fashion about a parallel plane therebetween;

wherein said translucent pane is connected to a corresponding one of said profile strips of said housing frame by means of contact-pressure strips screwed together with a set of one or more attachment screws with said pair of backing strips, wherein each of said contact-pressure strips are mitered at their seams; and wherein each of said pair of backing strips has grooves running parallel to a surface of said profile strip into which a corresponding threaded slide-in strip has been inserted.

13. The lamp in accordance with claim 12, wherein each of said pair of backing strips has a set of receptacle slits, and the bottom plate as well as said contact-pressure strips, have angular offsets engaging in a corresponding receptacle slit.

14. The lamp in accordance with claim 12, wherein each of said pair of backing strips has a set of furrowed grooves on their exterior sides to accommodate sealants.

15. The lamp in accordance with claim 14, wherein said sealants are inserted into said furrowed grooves, said sealants further comprising a 2-component polyurethane foam material.

16. The lamp in accordance with claim 12, wherein each of said profile strips are mitered at their seams to form upwardly open grooves and wherein connectors are inserted into the upwardly open grooves and are connected to DA corresponding threaded slide-in strips in a corner of said respective seam.

17. The lamp in accordance with claim 16, wherein sealants are inserted between the mitered surfaces of said profile strips, said profile strips abutting each other.

18. A lighting fixture, said lighting fixture comprising:

(a) a housing frame formed of four interconnected profile strips, with said profile strips having on the exterior side of said housing frame a set of one or more border strips, said one or more border strips for attaching said housing frame to a surface;

(b) a translucent pane, set into one housing side, on the interior side of said housing frame;

(c) a light source, said light source arranged in said housing frame and having a prism screen provided above said light source;

(d) a bottom plate set into a second housing side opposite of said translucent pane; said bottom plate having arranged thereon:

(i) a light source controller arranged proximate said light source;

(ii) a first reflector sheet for covering said controller;

(iii) a second reflector sheet arranged on said bottom plate; and (e) a pair of backing strips extending from each of said profile strips provided to support and attach said translucent pane or, respectively, said bottom plate, and wherein said pair of backing strips are designed identically and arranged in mirror-symmetric fashion about a parallel plane therebetween;

wherein said translucent pane is connected to a corresponding one of said profile strips of said housing frame by means of contact-pressure strips screwed together with a set of one or more attachment screws with said pair of backing strips, wherein each of said contact-pressure strips are mitered at their seams; and wherein each of said pair of backing strips has grooves running parallel to a surface of said profile strip into which a corresponding threaded slide-in strip has been inserted.

* * * * *

UNITED STATES PATENT AND TRADEMARK OFFICE

CERTIFICATE OF CORRECTION

PATENT NO. : 8,292,457 B2
APPLICATION NO. : 12/741169
DATED : October 23, 2012
INVENTOR(S) : Schenk et al.

It is certified that error appears in the above-identified patent and that said Letters Patent is hereby corrected as shown below:

In (75) Inventors: “Stephen” should be changed to “Stephan”

Signed and Sealed this
Twenty-second Day of January, 2013

David J. Kappos
*Director of the United States Patent and Trademark Office*